US008801061B2

(12) United States Patent
Holt (10) Patent No.: US 8,801,061 B2
(45) Date of Patent: Aug. 12, 2014

(54) PINE CONE COLLECTION DEVICE

(71) Applicant: Cecil Holt, Douglas, GA (US)

(72) Inventor: Cecil Holt, Douglas, GA (US)

( * ) Notice: Subject to any disclaimer, the term of this patent is extended or adjusted under 35 U.S.C. 154(b) by 0 days.

(21) Appl. No.: 13/631,823

(22) Filed: Sep. 28, 2012

(65) Prior Publication Data

US 2013/0266410 A1   Oct. 10, 2013

Related U.S. Application Data

(60) Provisional application No. 61/540,065, filed on Sep. 28, 2011.

(51) Int. Cl.
*A01G 1/12* (2006.01)
*E01H 1/12* (2006.01)

(52) U.S. Cl.
USPC .......................... 294/19.2; 56/328.1; 414/440

(58) Field of Classification Search
USPC ........ 294/19.2, 99.1; 414/439, 440; 56/328.1, 56/332
See application file for complete search history.

(56) References Cited

U.S. PATENT DOCUMENTS

| | | | | | |
|---|---|---|---|---|---|
| 3,604,190 | A | * | 9/1971 | Wray | 56/328.1 |
| 3,889,996 | A | * | 6/1975 | Campbell | 294/19.2 |
| 4,412,697 | A | * | 11/1983 | Verde | 294/19.2 |
| 6,422,621 | B1 | * | 7/2002 | Tandlich | 294/19.2 |
| 6,460,249 | B1 | * | 10/2002 | Holt, Jr. | 29/891 |
| 6,883,844 | B2 | * | 4/2005 | Carr | 294/19.2 |
| 7,698,882 | B1 | * | 4/2010 | Tinlin | 56/328.1 |
| 2005/0093312 | A1 | * | 5/2005 | Dickens | 294/19.1 |
| 2012/0279194 | A1 | * | 11/2012 | Pope | 56/328.1 |

\* cited by examiner

*Primary Examiner* — Dean Kramer
(74) *Attorney, Agent, or Firm* — Brian D. Bellamy (57) ABSTRACT

A rolling collection tool allows for retrieval of ground objects including pine cones by a user while standing erect. A method for construction of the device is provided in which a plurality of wires are formed into a generally oval shaped chamber and covered in a flexible covering in sets of two or more wires. The chamber is connected to a bail and handle and rolls to pick up and store objects in the chamber until emptied. The objects enter the chamber as the device rolls by temporary separation of the covered wires for the object, and the device retains the objects by resilient return movement of the covered wires to their original position. The flexible covering on the wires rotates around sets of the wires as the device retrieves objects.

4 Claims, 12 Drawing Sheets

PINE CONE COLLECTION DEVICE

PRIORITY CLAIM

This application claims benefit of priority of U.S. Provisional Application No. 61/540,065 filed on Sep. 28, 2011.

BACKGROUND OF THE INVENTION

The present invention relates to a rotary pine cone gathering device and a method of manufacturing the device. In particular, a rotary pine cone gathering device is constructed having a wire basket with loose rotatable coverings over the wires or sets of wires for gathering pine cones or other objects lying on the ground.

The primary purpose of this invention is to provide homeowners with an option for gathering pine cones without stooping and having to gather them by hand. While hand operated wire basket gathering devices are well known for manually harvesting nuts, such wire basket harvesting devices include narrow steel wires or cages that are not effective for gathering fragile and large options such as pine cones. Thus, wire basket nut harvesters have been avoided as far as gathering pine cones has been concerned. Finding a device for more effectively gathering pine cones is particularly important to our senior citizens who are often interested in gardening and landscaping.

Manually operated pine cone gathering devices help individuals gather pine cones while standing erect and gather more than one could gather without such tools. Previously existing hand operated gathering devices have been either inefficient or cost prohibitive to manufacture, or both; as a result, an ongoing need exists for improved pine cone gathering devices.

For example U.S. Pat. No. 5,168,692 to Dudley discloses a rolling nut harvesting apparatus that may also collect pine cones. The Dudley device includes a complex basket and hopper; this complex device is not cost effective to construct and less attractive to offer the general consumer as compared with the present invention. The present invention offers an elegant solution for collection and storage of pine cones in a single chamber that is simple to manufacture and cost effective.

In another example of a prior pine cone retrieving device, U.S. Pat. No. 5,490,701 to Glass teaches a relatively more cost effective and simpler device than Dudley provided in the example above. The Glass device comprises an array of three flexible elongated tines. The tines taught by Glass converge to retrieve one pine cone at a time and may hold a few pine cones before requiring removal of the pine cones from the tines. The Glass device, while simple, is limited by speed of use, and does not include an efficient means for storing pine cones while at the same time gathering.

Similarly, U.S. Pat. No. 7,490,879 to Seefeldt et al. discloses a pine cone collection tool comprising an elongate tubular body useful for both collection and storage. However, this tubular device still requires collection of one pine cone at a time and greater storage capacity would be desirable. As a result, a need still exists for a pine cone gathering device that is inexpensive to manufacture and has increased efficiency.

U.S. Pat. No. 6,460,249 to Cecil Holt, Jr. provides a nut harvesting device to provide a chamber for collection of nuts that is partially constructed by several related steps to the present invention. Holt does not provide a means for collecting pine cones without damaging the pine cones or having them hang within the wires of the chamber previously though, and Holt does not previously teach a device having efficient and significant storage for collection of a significant plurality of pine cones.

SUMMARY OF THE INVENTION

The present invention provides a device for gathering pine cones and other large or irregular shaped objects that might lie on the ground. A method is provided for construction of the device. A plurality of wires of substantially equal length are provided and arranged substantially parallel with an open ended circular configuration having an outer periphery and an inner periphery. A washer is inserted on each end of the wires within the inner chamber formed by the wires. The chamber of the device is formed by pressing an inner sleeve into the inner periphery of the wires. Inserting the inner sleeve causes the inner sleeve and an outer sleeve to impinge against the wires. The wires are shaped using a dye inserted within the wires to bend the wires and begin the formation of an oval cylindrical chamber.

A plurality of rotatable nylon tubes are placed over pairs of wires. The coverings slide over the wires from an unlocked end where the ends of the wires are exposed temporarily; the wires slide toward the locked end, after which the unlocked ends of the wires are secured together by an inner sleeve and outer sleeve pressed together holding the wires. The tubing is flexible and moves with the wires to form an ovoid chamber having a area for collecting a multitude of pine cones or other objects.

A bolt is inserted through each of the inner sleeves and bears against the outer sleeve. A nut, metal washer, and rubber washer bearing against the inside of the wires is tightened on each end of the bolts causing the wires to form substantially flat ends of said chamber between the nuts and inner sleeves and outer sleeves. A bail attaches the chamber to a handle for use as a hand-held nut harvester that is effective, yet simple and inexpensive to construct.

A first object of the present invention is to provide a device that retrieves pine cones or other objects into a storage chamber and operates more efficient than prior hand operating pine cone gathering devices.

Another object is to provide a device that will retrieve pine cones and objects that are irregularly shaped and difficult to pick up by previous nut gathering devices.

An object is to provide a gather device for retrieving pine cones that are many different sizes.

As another object the device retrieves pine cones having barbs without hanging on wires.

In a related object, the device retrieves pine cones that are fragile without causing the pine cones to crumble under too much force.

The invention solves an ongoing and long felt need for a gathering device that is flexible enough to accommodate pine cones, as well as other similar sized objects.

The invention provides a device that is adaptable and works for gathering both small and large pine cones and objects while being particularly effective for most all size of pine cones.

These and other objects will be apparent to those skilled in the art, and the invention should be interpreted and defined in accordance with the claims that follow.

DETAILED DESCRIPTION OF THE INVENTION

Figure 16:
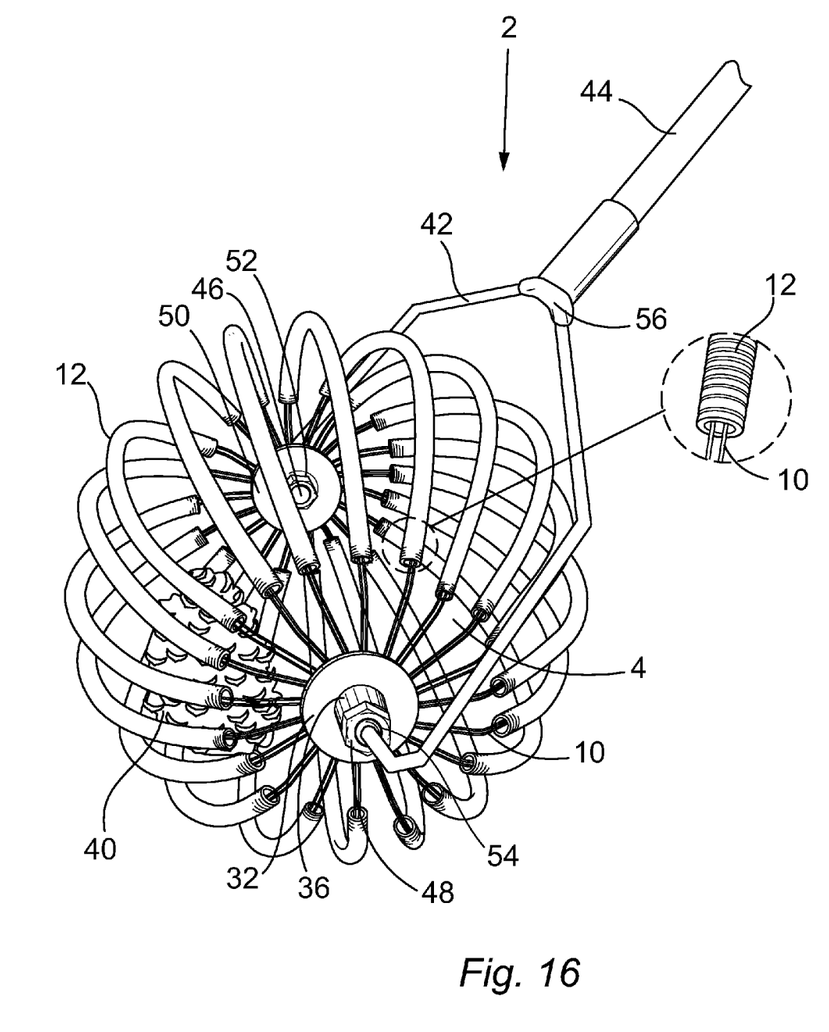
FIG. 16 is a perspective view of a device constructed in accordance with an embodiment of the invention connected to a handle for operation.

Referring now to the drawings, a gathering device 2 and the process of manufacturing such device is shown. The device is constructed in a way that the device is effective for gathering fragile objects such as pine cones from the ground. As shown in FIG. 16, the completed device 2 includes a basket 4 comprised of a plurality of wires 10 that are combined in small sets of preferably two wires and sheathed in plastic tubes 12. In operation, the device rolls along the ground causing the wires to separate upon encountering a pine cone or object until the object enters the basket and the resilient wires 10 return to their normal position causing the object to be entrapped within the basket. During operation the tubes 12 roll about the wires to prevent damage to the objects entering the basket; further, the tubes hold sets of the wires together to permit larger openings between the wires upon encountering an object both in terms of the spacing between the sets of wires and the propensity for the wires to separate more easily for swallowing the objects. Once the basket is filled, the objects are emptied by separating the wires to form a gap and dispense the objects from the basket to some other container or location.

Figure 1:
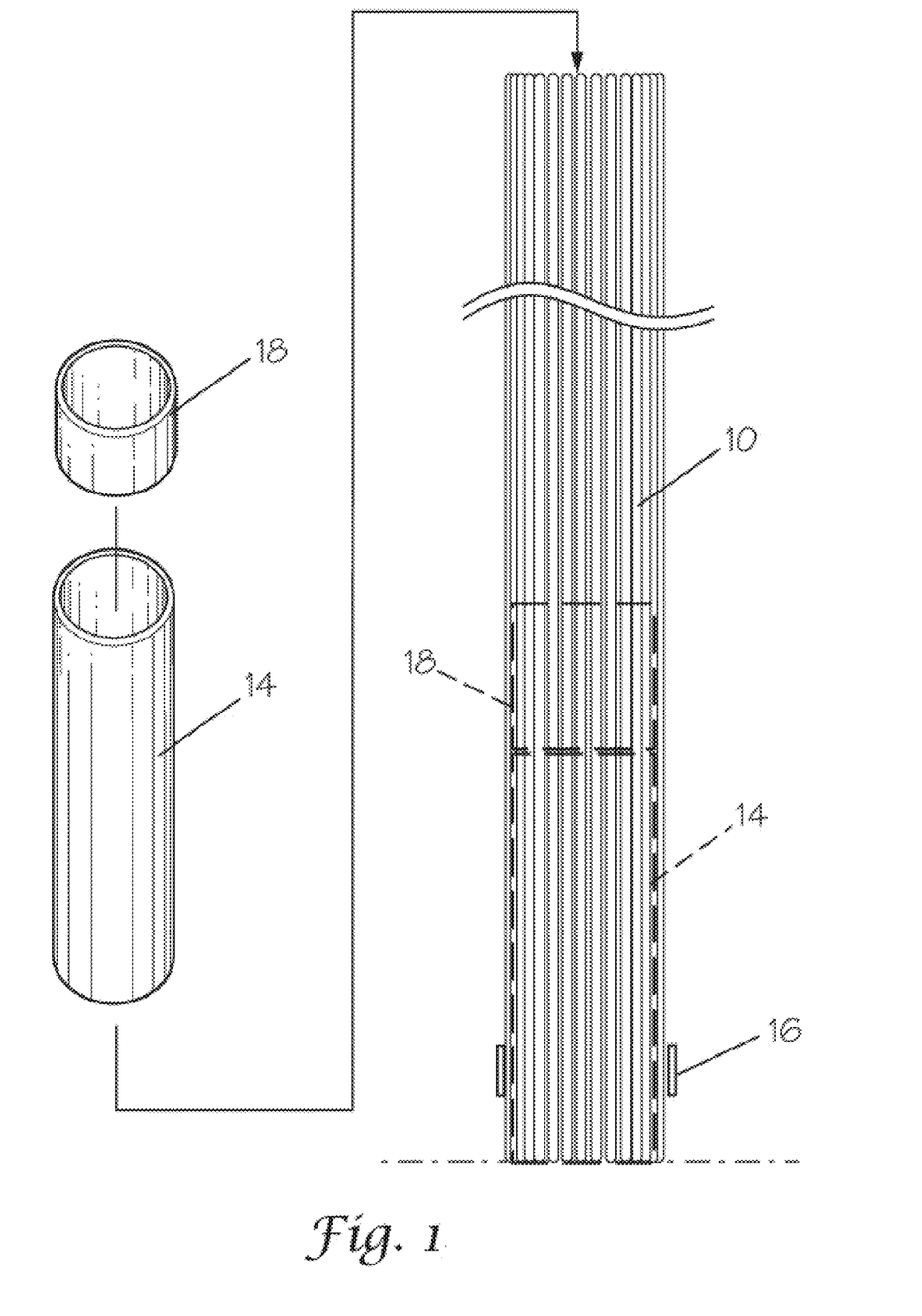
FIG. 1 is a perspective view of the inner sleeve blank and first inner sleeve in combination with a sectional plan view of an arrangement of wires in accordance with a step for construction of the device with the first inner sleeve for insertion inside the wires on one end thereof.

The method for the manufacture of the device is taught by first referring to FIG. 1 in which the first of several steps is shown. The device is constructed in several steps as will be described herein. In a first step a plurality of wires 10 of substantially equal length are provided and these wires are grouped together. Once expanded, the wires form a chamber of the basket portion of the device. The wires, generally comprised of steel, are gathered in parallel arrangement with an open ended circular configuration. The circle of wires is wrapped around an inner sleeve blank 14 on one end of the inside of the wires, whereby the wires form a cylinder shape about the inner sleeve blank for further processing.

The wires 10 should be flexible and resilient for the purpose of retrieving objects from the ground by separation of the wires through contact with an object; suitable wires have been used for nut harvesting devices comprised of 0.041 gauge music wire. The wires are cut longer than on a prior nut gathering device to provide increased capacity and flexibility found uniquely suitable for gathering pine cones. Whereas, the additional length of the wires would cause the device to be less effective in gathering smaller and firmer objects such as nuts, the wires on the present device have been found effective for pine cones. A preferred length of raw wire for manufacture of the device is 23 to 25 inches in length.

In preparation for the next step of manufacture, the wires may be held and supported on the inner sleeve blank 14 by a rubber band 16 or other retention device. With the inner sleeve blank wrapped within the wires on one end, insert a first inner sleeve 18 that is shorter and smaller circumference than the inner sleeve blank within the opposing end of the wires as shown in FIG. 1. Slide the first inner sleeve within the wires to where it rests on top of or abutting the edge of the inner sleeve blank within the wire structure. At this point in construction, leave the first inner sleeve in abutting relation for inner sleeve blank for further processing.

Figure 2:
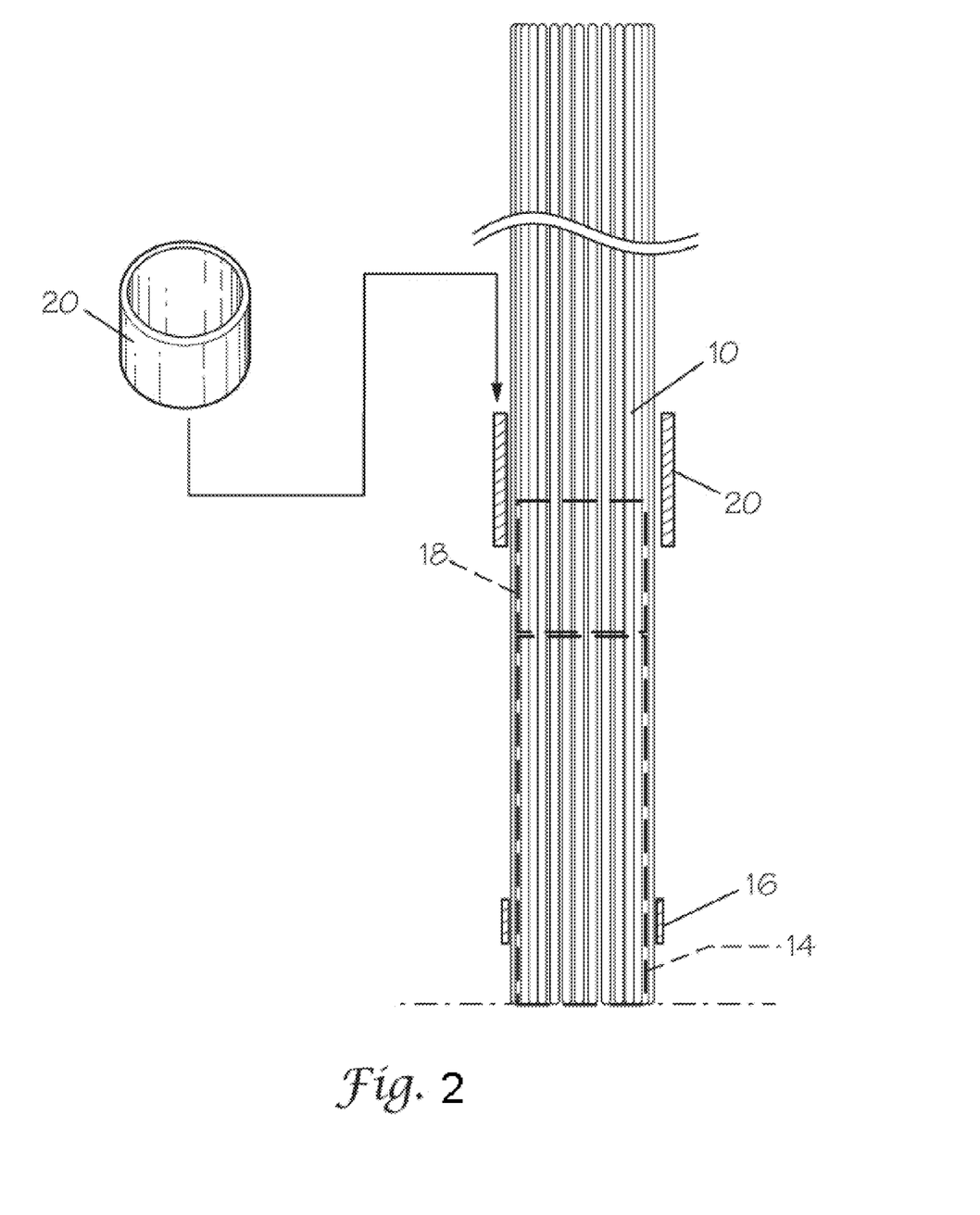
FIG. 2 is a perspective view of a first outside sleeve shown in combination with a sectional plan view of wires arranged in a step for construction of the device in combination with the first outside sleeve inserted over the outside of the wires near the end where the first inner sleeve is inserted.

While the first inner sleeve 18 and the inner sleeve blank 14 remain within the wrapped wires 10, insert a first outside sleeve 20 over the opposing ends of the wires and, then, slide the first outside sleeve downwards or toward the first inner sleeve until the first outside sleeve will not slide any further down by hand or without additional force as in FIG. 2. Sliding the first outside sleeve over the wires begins the process of locking the wires into place between the first outside sleeve and the first inner sleeve.

Figure 3:
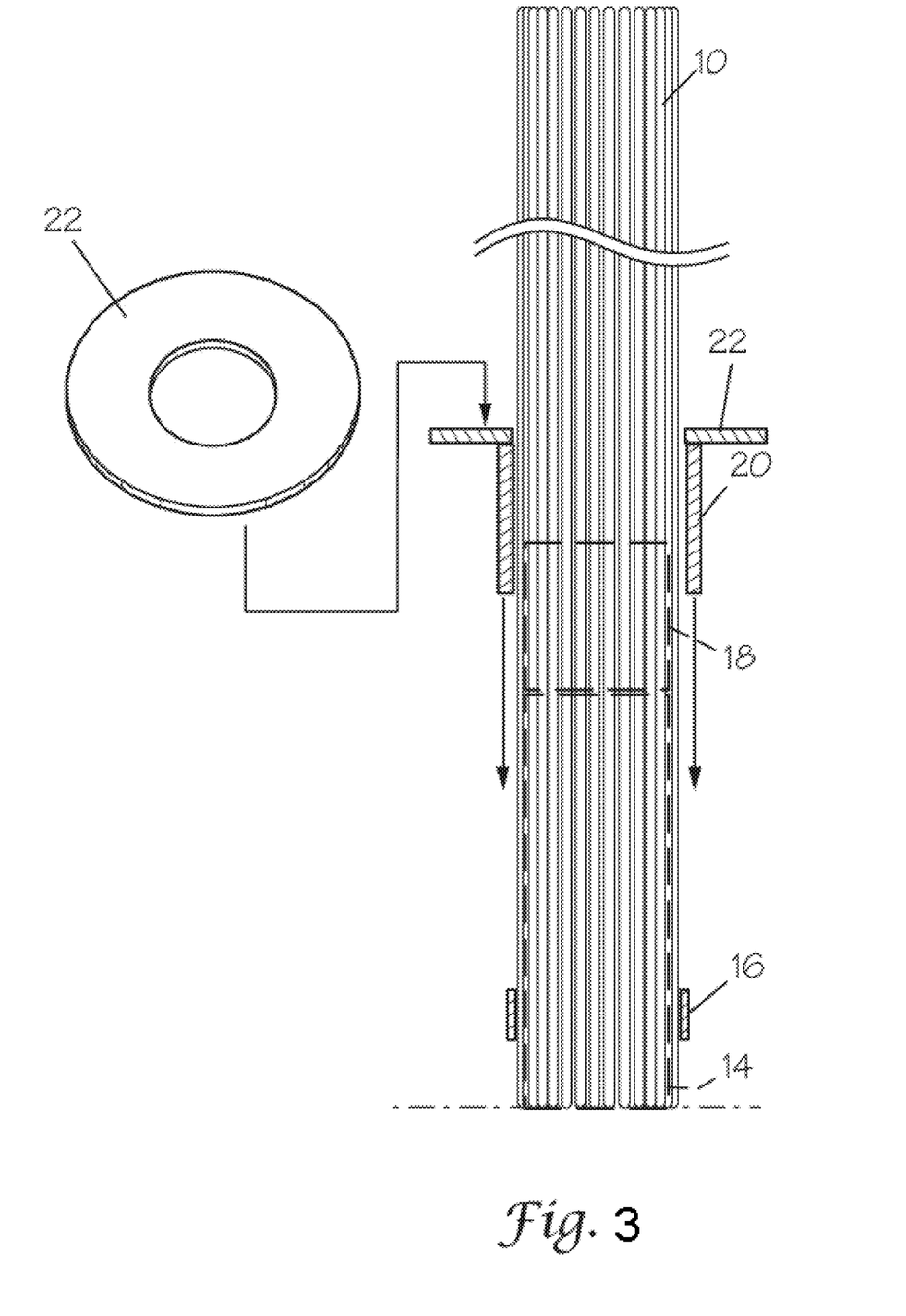
FIG. 3 is a perspective view of a washer shown in combination with a sectional plan view of wires arranged in a step for construction of the device in combination with the first washer inserted over the outside of the wires and abutting the first outside sleeve.

With the first outside sleeve 20 positioned over the wires 10, slide a washer 22 over the outside of the wires on the end opposing the first inner sleeve 18 in accordance with the illustration in FIG. 3. Slide the washer downward or toward the first outside sleeve until the waster touches the first outside sleeve or abuts against it. Next, remove the inner sleeve blank 14 using a knife or similar means inserted through the wires and by pressing downward on the inner sleeve blank to slide it out from within the wires as shown in FIG. 4.

Figure 4:
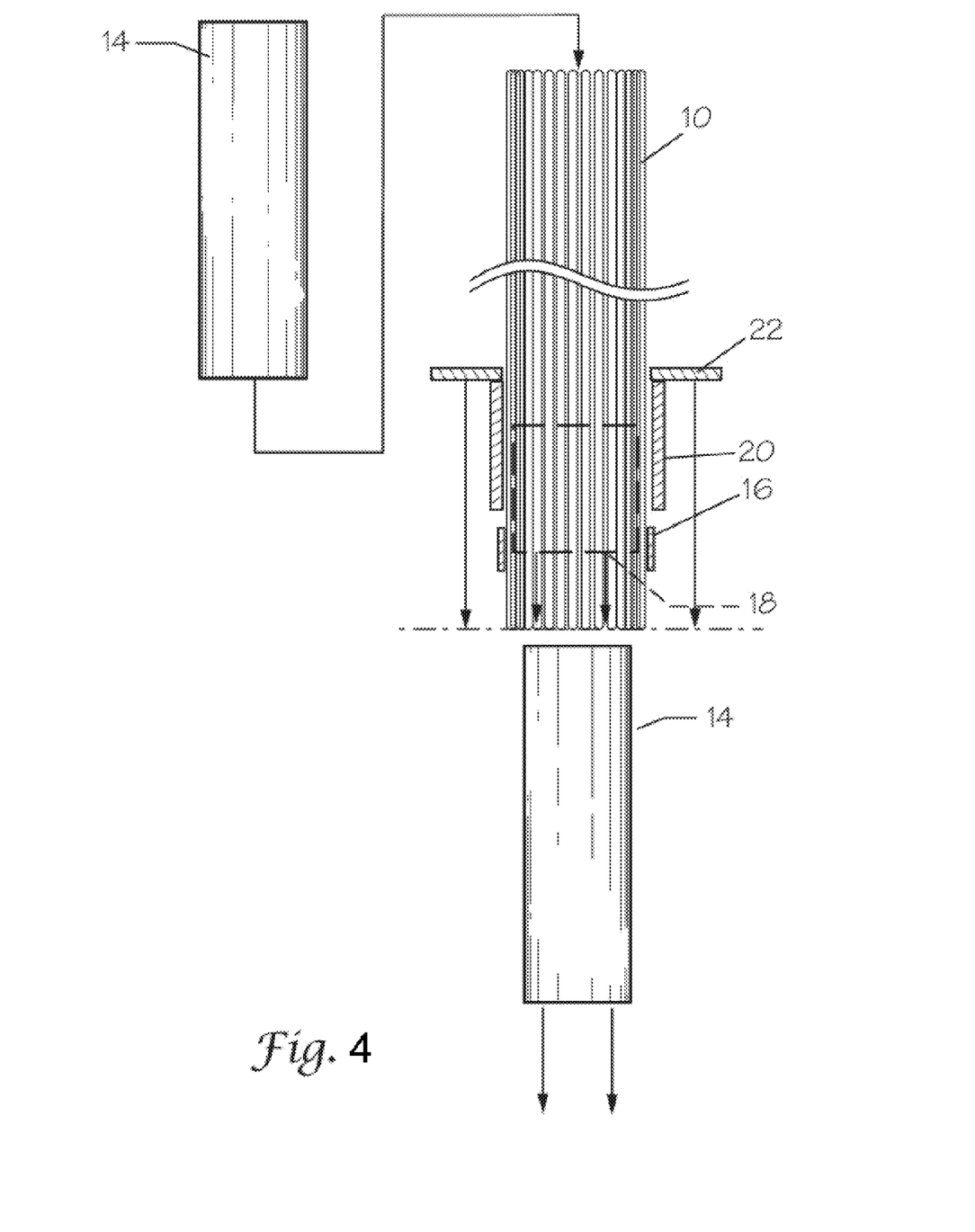
FIG. 4 is a plan view of the inner sleeve blank in combination with a sectional assembly plan view of wires arranged in a step for construction of the device illustrating insertion of the temporary inner sleeve blank and removal of the blank for insertion of the first inner sleeve.

In FIG. 4, after removing the inner sleeve blank 14, slide the first inner sleeve 18 down to a position that is flush with the ends of the wires 10 at a first end of the device. Use a knife or like to move the first inner sleeve into position as needed. Flush the ends of the wires against a flat surface to ensure an even alignment of the wires and the first inner sleeve. After putting the first inner sleeve into position at the first end of the wires, push the first outside sleeve 20 and the washer 22 downward or toward the first inner sleeve until both the first outer sleeve and washer fit tight together and can no longer be moved downward by hand over the wires. Reinsert the inner sleeve blank above the washer for support of the wires during the construction process. Use a rubber band 16 or retention device to hold the wires and the inner sleeve blank together in place.

Figure 5:
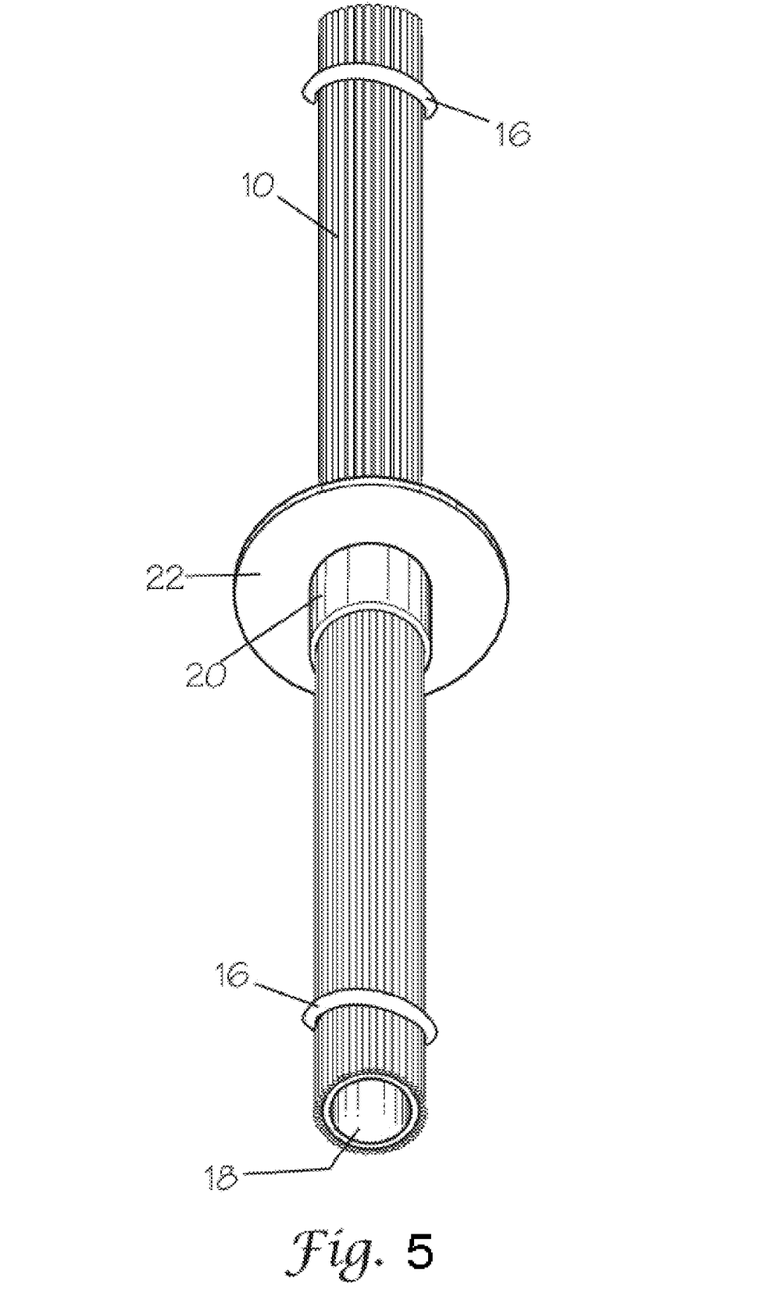
FIG. 5 is a perspective view of wires arranged in a step for construction of the device illustrating the first inner sleeve being flush with one end of the wires.

FIG. 5 shows the alignment of the wires 10 on the first end of the device 2. Check the alignment and position of the wires about the first inner sleeve 18 and the inner sleeve blank 14. Ensure that all of the wires are both straight and level before locking the first outside sleeve 20 over the first inner sleeve by forcing the first outside sleeve over the wires and the first inner sleeve.

Figures 6, 7:
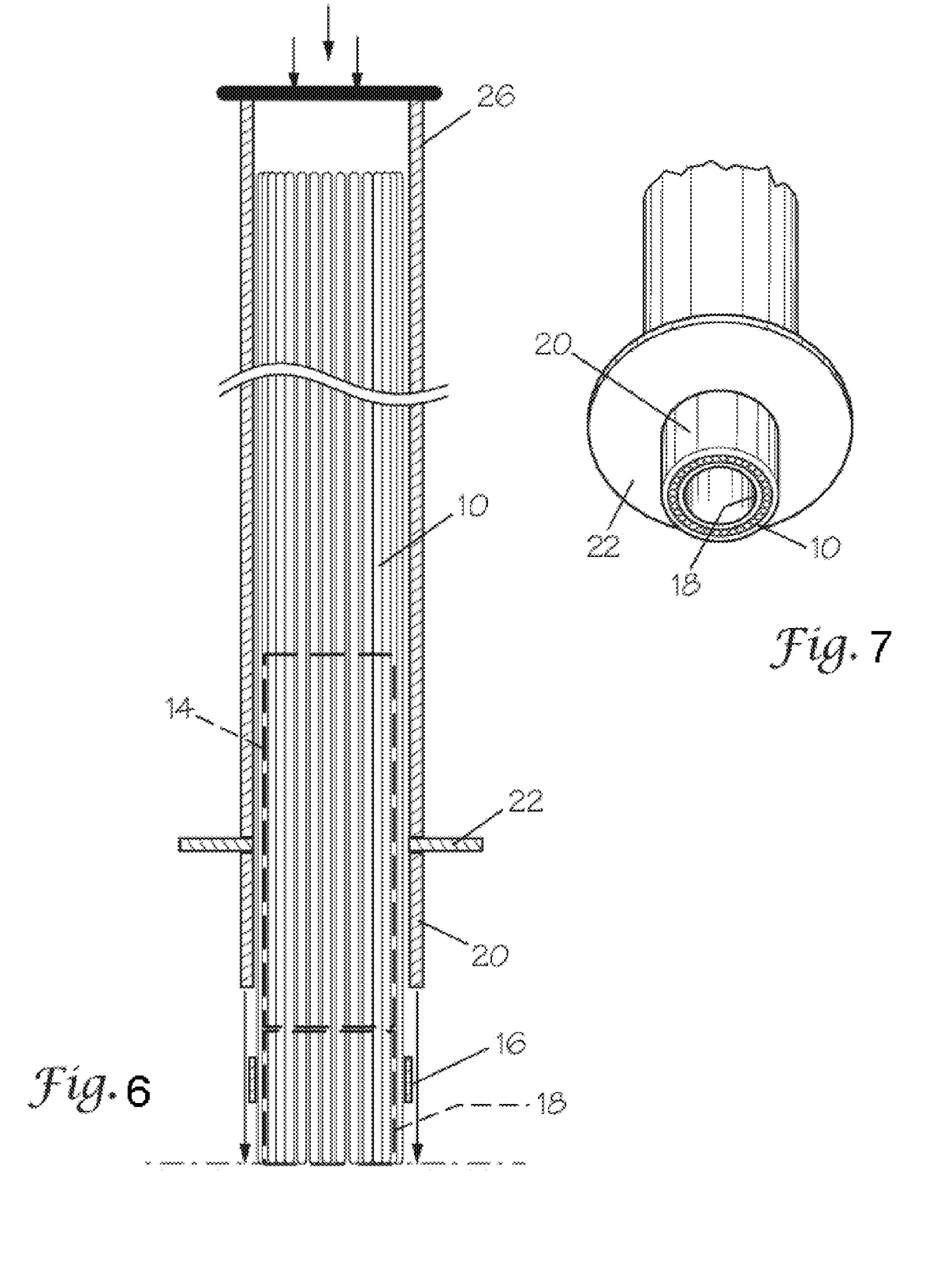
FIG. 6 is a sectional plan view perspective view of wires arranged in a step for construction of the device illustrating the step of moving the first outside sleeve over the first inner sleeve so as to impinge on the wires at the first end of the device.
FIG. 7 is a perspective view of wires arranged in a step for construction of the device showing the wires on the first end of the device held between the first inner sleeve and the first outside sleeve.

To lock the wires 10 into place, firmly tap the washer 22 downward or toward the first inside sleeve 18 as shown in FIG. 6. During the tapping process, the peripherally arranged wires are pressed between the sleeves 18 and 20, and the wires will be compressed between the sleeves and impinged upon between the outer sleeve 20 and the inner sleeve 18. This same process of compressing the peripherally arranged wires between the inner and outer sleeves is repeated on the opposing second end of the wires. The inner and outside sleeves should be properly sized circumference to allow for a tight fit between the sleeves for the wires to be securely held. The ends of the wires may be positioned against a flat surface during forceful tapping of the outside sleeve over the inner sleeve and compression of the wires to keep the ends of the wires flush and provide a support against the force of tapping the washer. The washer pushes the outside sleeve over the smaller circumference inside sleeve. Thereby, the first outside sleeve locks the wires in place between the first outside sleeve and first inner sleeve through compression of the wires between the two sleeves.

Once the washer 22 and first outside sleeve 20 have been forced into position over the first inner sleeve 18, the wires 10 will be flush on the end and tightly held within the sleeves similar to the illustration of FIG. 7. The friction between the wires and the sleeves will hold the wires and also cause the plurality of wires to separate slightly in the center. A dye 24 is used to further expand and separate the wires and form the chamber defined by the basket 4 in subsequent steps.

Figure 8:
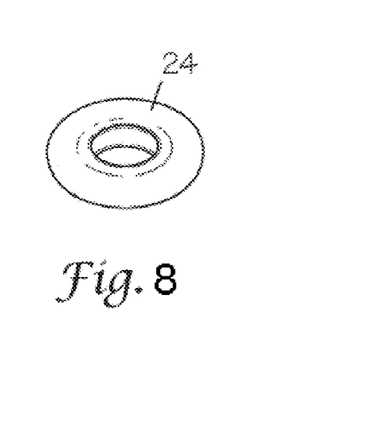
FIG. 8 is a perspective view of illustrating a dye for temporary insertion into the wires for bending the wires outward at an angle.

Before proceeding to form the wires and lock the opposing second end of the wires, remove the inside sleeve blank 14 that was inserted before the process of locking the first outside sleeve 20 and first inner sleeve 18. The inner sleeve blank will be easy to remove by hand, as the wires 10 are spread on the end opposing the locked sleeves. Any retention device 16 or rubber band used on the wires during the prior steps of assembly can be removed to facilitate removal of the inside sleeve blank from the wires. The spread of the wires prepares the assembly for insertion of a small dye 24 that is illustrated in FIG. 8 inside the wires as shown in FIG. 9.

Figure 9:
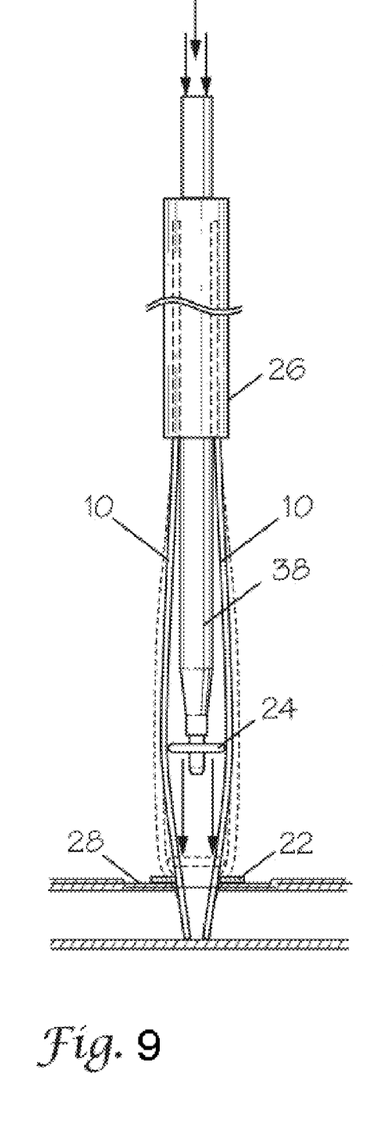
FIG. 9 is a sectional assembly plan view of wires arranged in a step for construction of the device illustrating the dye in FIG. 11 being inserted into the wires to be pressed, a metal pipe to keep the wires from springing outward while the die is pressed by rod against a press.

To bend the wires on the first end, insert the small dye 24 into the open spread end of the wires 10 and move the dye downward into the secured end of the wires by hand as represented in FIG. 9. The circular dye in FIG. 8 will be used to bend the wires outward at an angle, which helps to form the chamber of the basket 4 for pine cone retrieval and storage with the device.

Referring further to FIG. 9, the dye 24 is positioned by hand into the wires 10 as far as possible, and the dye is aligned into a position with the circumference of the dye contacting the inside surface of the wires within the chamber. This positions the dye for being pressed further downward or toward the locked first end of the wires where the first inner sleeve 18 and first outside sleeve 20 is positioned. An unlocked end of the wires that are situated at the opposite end of the wires opposing the locked end will naturally spread apart with the dye inserted. With the dye inserted into this position, a retention device 26 may be placed around the unlocked second end of the wires as in FIG. 9 to hold the wires closer together temporarily while pressing the dye toward the locked end. Pressing the dye will naturally cause the wires to expand if not retained by some means. Retaining the wires will provide a safe environment for pressing the wires, whereby the unlocked ends of the wires are not able to stab a person.

Figure 10:
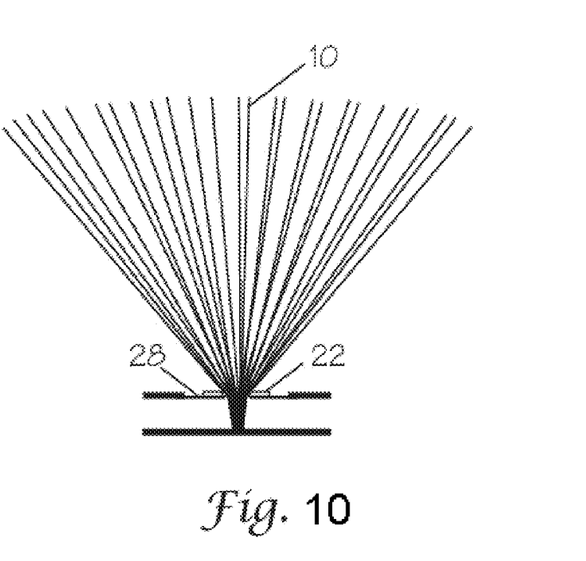
FIG. 10 is a sectional plan view of wires arranged in a step for construction of the device with the collar of FIG. 9 removed and illustrating the wires being bent outward.

Also shown in FIG. 9, the wires 10 are pressed by sliding the locked end of the assembly over the shaft of a press 28, the process begins by slightly pressing the wires to open the chamber and cause the dye 24 to slide further downward toward the locked end of the wires at the first inner sleeve 18 and first outside sleeve 20. The dye is then fully pressed into engagement with the first inner sleeve or so far toward the first inner sleeve as desirable, so as to deform and bend the wires to the extent specified for the final design and shape of the chamber to be formed. Pressing the dye toward the first inner sleeve, therefore, permanently deforms the wires and causes the wires to spring outward from the first locked end. The dye is then removed and the wires retain the deformed shape causing the wires to spring outward on the unlocked second end of the wires as shown in FIG. 10.

Figure 11:
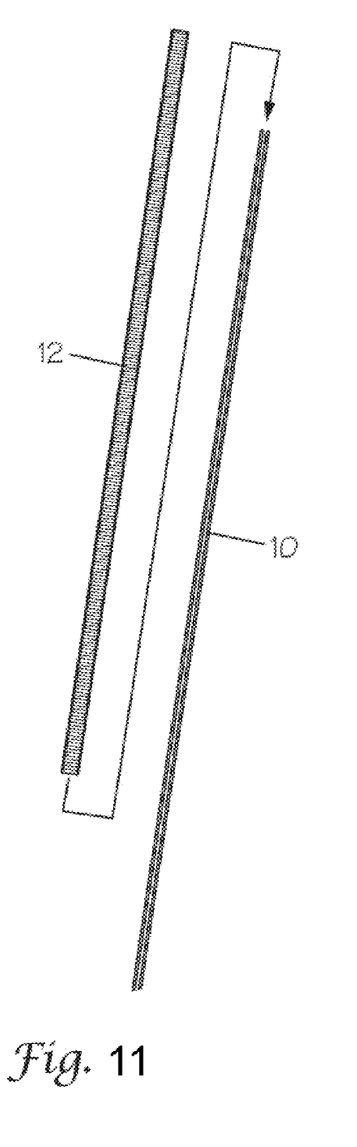
FIG. 11 is an assembly plan view of wires arranged in a step for construction of the device illustrating a tube placed over a set of the wires.

Spreading the wires 10 prepares them for insertion of a rotatable covering or tubes 12 over sets of one or more of the wires. A retention device, such as a rubber band, may be used for safety to keep the wires closer together and less hazardous for accidental injury. Once the wires are prepared, a plurality of rotatable coverings or tubes 12 are placed over individual or groupings of wires as shown in FIG. 11. The coverings slide over the wires from the unlocked end and slide toward the locked end, thereby exposing the unlocked ends of the wires for further processing in manufacture of the device. In the preferred embodiment shown, the majority of the wires are paired in sets of two, and a covering is placed over each pair to provide a rotatable sheathing over the wires. Some individual wires may be stranded and can be covered individually by such covering if more precision is not required for the quality and application.

The covering comprises flexible plastic tubing that is cut into tubes 12; the tubing is commonly used as a conduit for electrical wiring. The flexible tubing is flexible enough for the chamber to spread apart as the wires 10 spring into position and form an ovoid chamber having an area for collecting a multitude of pine cones or other objects. The flexible tubing is also durable enough for long lasting use in collecting objects such as pine cones while rolling the device on the ground.

Figure 12:
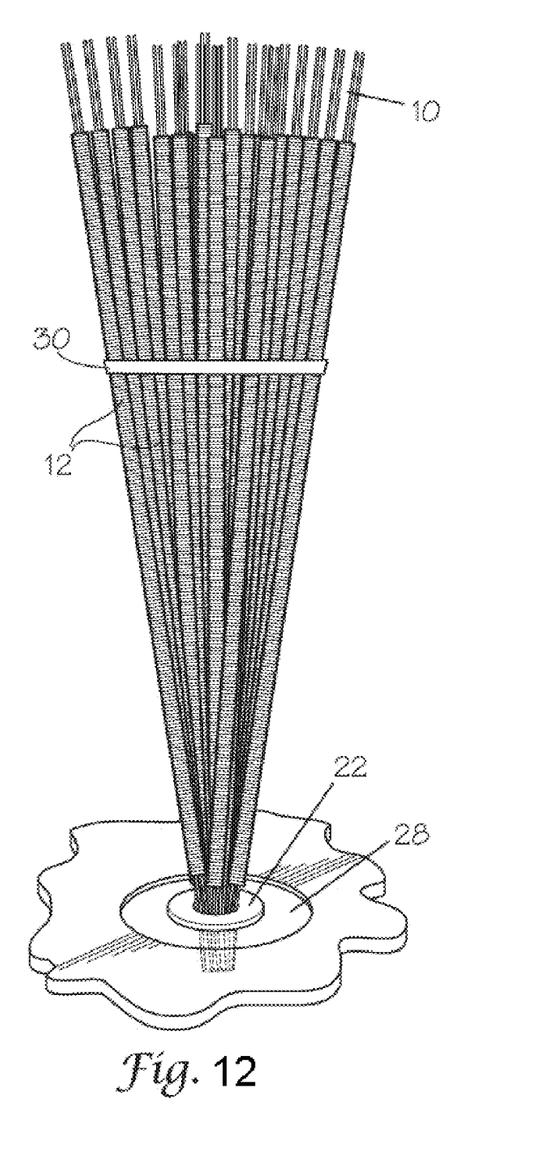
FIG. 12 is a perspective view of wires arranged in a step for construction of the device showing tubes inserted over all of the wires and restrained inward by a rubber band.

A typical flexible tubing section or tube 12 is shown in FIG. 11 and comprises conduit tubing or like tubing material as discussed above. Nylon provides both a flexible and durable material for the tubing; thus, nylon is a suitable material for the tubing. For a preferred size pine cone retrieval device 2, the wires 10 are manufactured to a specification desirable for use of 18 inch tubing sections. Thus, each tube is cut to a length of 18 inches prior to insertion onto the wires. In one embodiment, as the tubing is installed over the wires, a piece of tubing may be inserted over every two naked wires in series until all of the wires are covered in sets of two by a section of tubing. Referring to FIG. 12, once all of the wires are covered by tubing, the wires are brought closer together at the center of the length thereof and retained in close proximity by a retention device such as a rubber band 30 for work on the unlocked end of the wires.

The process for locking the wires on the opposing end is very similar to the process for locking the first end. First as illustrated in FIG. 13, a second washer 32 like that on the first end of the wires is placed over the loose end of the wires by sliding the wires 10 through the aperture of the washer such that the wires are situated on the inside of the washer and run through with loose ends of the wires extending beyond the washer.

Figure 13:
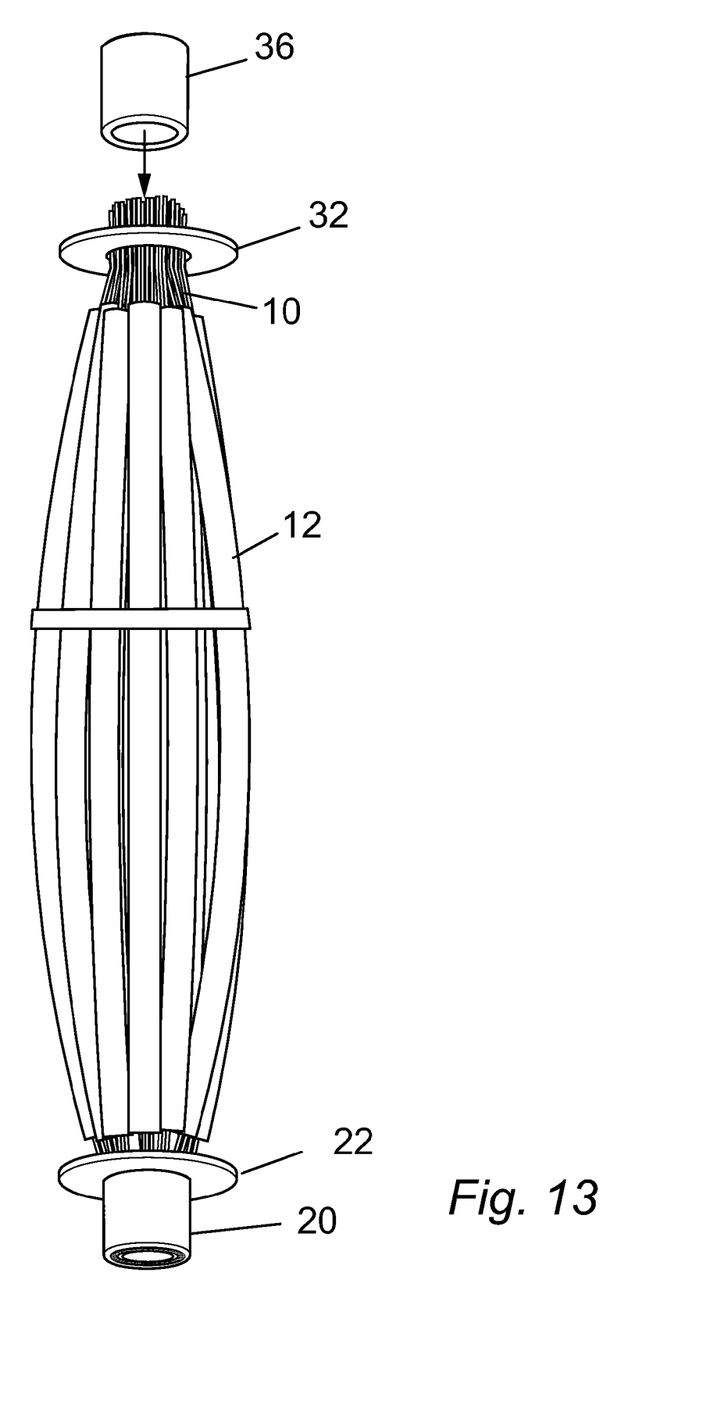
FIG. 13 is a perspective assembly view of wires and a second outside sleeve arranged in a step for construction of the device in combination with a second washer inserted over a second end of the wires opposite the first end.
Figure 14:
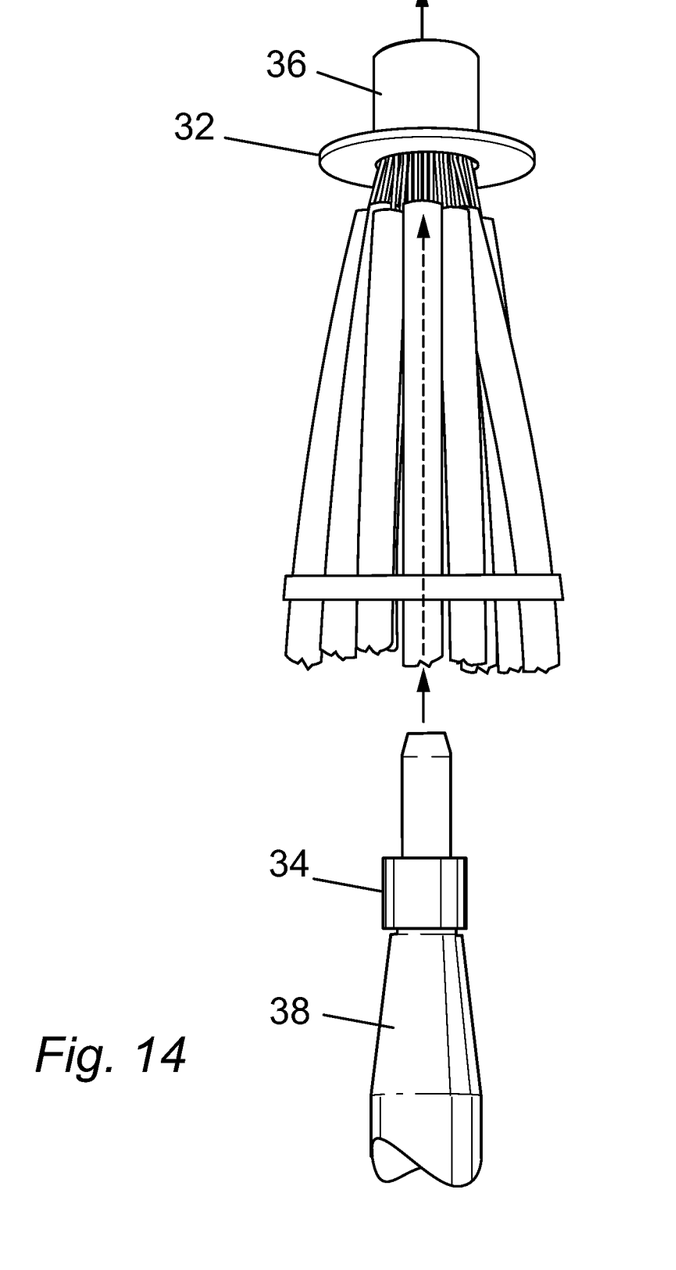
FIG. 14 is a perspective view of wires arranged in a step for construction of the device in combination with a rod used in the step of pressing the second inner sleeve into the second outside sleeve to impinge on the wires on the second end of the device.

Next, as depicted in the assembly of FIG. 13 and FIG. 14, a second outside sleeve 36 is then inserted over the loose ends of the wires that extend beyond the washer. The second outside sleeve slides over the wires 10 and then abuts the second washer 32. Then, in accordance with FIG. 15, the partially assembled device is then placed over a rod 38, whereby the rod is positioned on the inside of the chamber created by the wires. An end of the rod has a dye formed for pressing a second inner sleeve 34 into position inside of the wires and the second outside sleeve. Thus, the second inner sleeve is positioned onto the dye end of the rod, and the dye end of the rod is position into alignment with the unlocked end's outside sleeve and wires.

Figure 15:
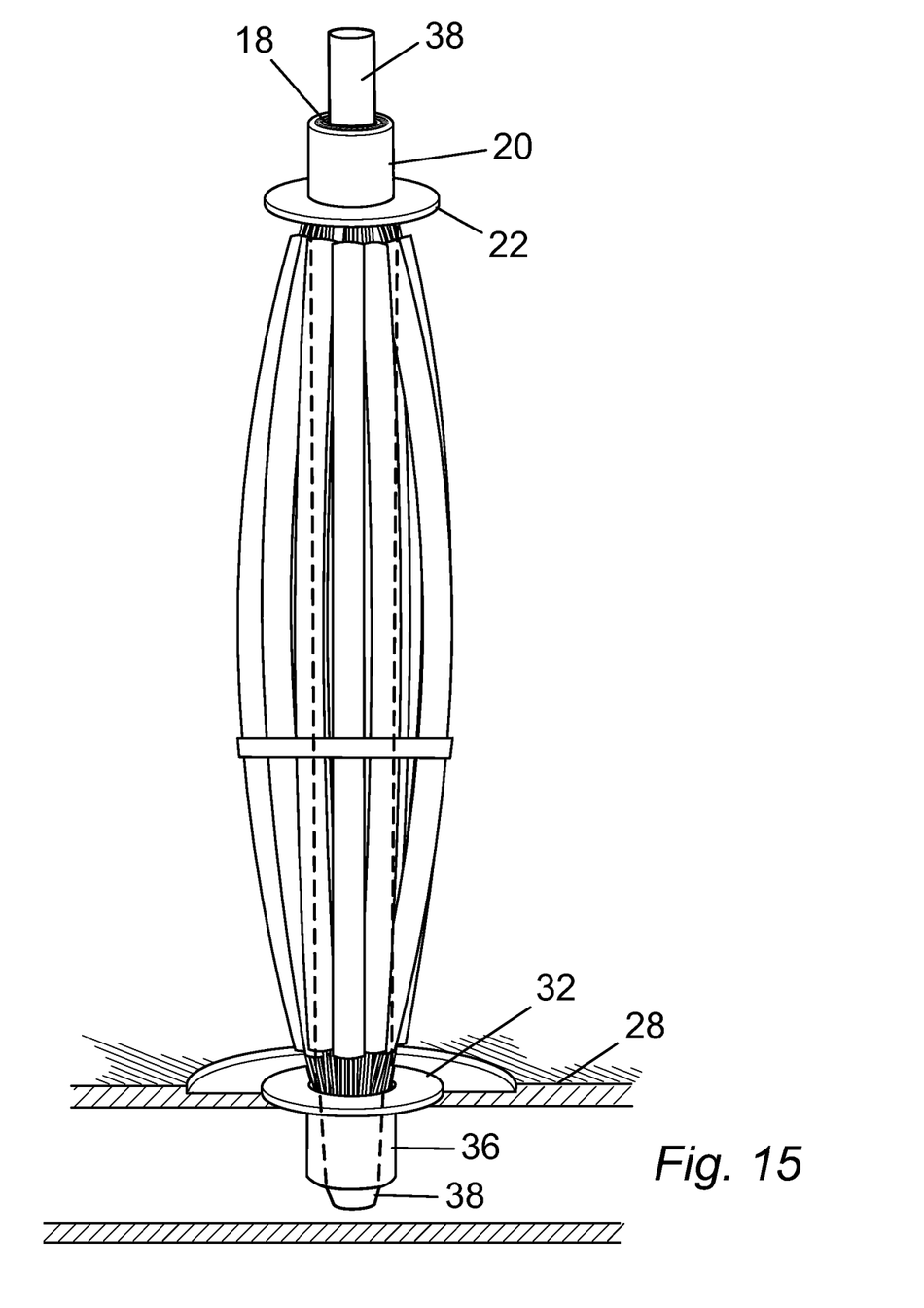
FIG. 15 is a perspective view of wires arranged in a step for construction of the device illustrating the step of pressing the second inner sleeve into the second outside sleeve to lock the wires in place.

The opposing end of the rod 38 is situated through the locked end within the chamber as shown in FIG. 15 for operation of the press 28. The second inner sleeve 34 is pressed down or into the second outside sleeve 36 on the unlocked second end of the wires to lock the wires 10 on the second end into place between the second outside sleeve and the second inner sleeve. The press may be operated by tapping the second inner sleeve into the second outer sleeve or by using a press machine. The enlarged portion of FIG. 15 shows the second end of the wires of the device showing the wires locked in place between the second inside sleeve and second outside sleeve; thereby, the wires on both ends of the chamber formed by the wires are then locked into place.

The second end of the wires 10 is locked and prepared for removal of the press. The rod 38 used for the press 28 may then be pulled out and removed from the device, and the second end of the wires of the device is then ready for a dye to be inserted inside the chamber for expansion of the wires on the second end. Care is used not to injure the tubes 12 on the wires and the dye is pressed on the second end to expand the wires. The chamber is pressed causing the chamber to further enlarge into a generally oval shaped configuration. The wires are formed on each end to bend the wires slightly and form the basket 4 defined by the chamber. Next, the inner wall of the chamber is pressed causing deformations in the wires near the first and second ends of the chamber. The deformations are equally spaced from the washers 22 and 32 near each end of the wires of chamber. The deformations allow the plurality of wires 10 to bend toward a vertical orientation near the washers, such that the final structure of the chamber will appear as shown in FIG. 16 with the plurality of wires formed into a generally oval chamber having generally flattened ends.

The device 2 is formed to include a basket 4 for retrieval of pine cones 40 as shown in FIG. 16. The device includes a means for attaching the device to a bail 42 and a handle 44 that are used during hand operated use of the device. In particular, after the deformations are pressed into the wires 10, bolts 46 are inserted through the inner sleeves 18, 34, and the heads 48 of the bolts bear against the outer and inner sleeves shown in FIG. 16. Rubber washers are disposed on the bolts 46 and against the inside of the ends of the chamber. Metal washers are disposed on the bolts against the rubber washers, such that both the metal washers and rubber washers are inner washers 50 within the chamber. Hex nuts 52 are threaded on the ends of bolts, whereby the nuts are tightened on the bolts 46. As the hex nuts are tightened on the bolts, the ends of the wires are clamped tightly between the inner washers 50 and the outer washers 22, 32, thereby deforming the wires further and thus causing the ends of the chamber to flatten and bowing the center portion of the chamber into a larger generally oval shaped configuration forming the basket 4.

A small cavity 54 shown in FIG. 16 is drilled into the head 48 of each bolt 46 on both ends of the device 2 for receiving the bail 42. A handle 44 is attached to bail as shown in FIG. 16 by means of a wing nut 56 welded to said bail. The handle may be constructed of wood, plastic, fiberglass or suitable material depending on the qualities desired including cost and durability. A threaded bolt inserted through the wing nut tightens into a threaded receptacle of the handle. Thereby, the bail retains the basket 4 and allows the basket to roll as the device 2 is operated by the handle 44 to retrieve pine cones 40 as depicted in FIG. 16.

The invention claimed is:

1. A rolling device for retrieval of ground objects comprising
    a plurality of wires shaped and forming an ovoid chamber, said wires having a first end and a second end;
    a plurality of flexible tubes, each tube covering a set of the wires and each set having a portion of the wires extending from the tube on each end in which each set of wires comprises at least two of the wires;
    said first end of the wires secured on a first end of the ovoid chamber and said second end of the wires secured on a second end of the ovoid chamber;
    a bail connected at a first end and a second end of the bail to the first end of the ovoid chamber and the second end of the ovoid chamber for rolling the ovoid chamber between the connected ends of the bail; and
    a handle connected to the bail for use of the rolling device by a user while standing erect.

2. A rolling device for retrieval of ground objects as in claim 1 in which each set of wires comprises exactly two wires.

3. A rolling device for retrieval of ground objects as in claim 2 in which all of the plurality of wires are each included in one of the set of wires that is covered by one of said flexible tubes.

4. A rolling device for retrieval of ground objects comprising:
    a plurality of steel wires shaped and forming an ovoid chamber, said wires having a first end and a second end;
    a plurality of flexible nylon tubes, each tube covering a set of two of the wires and each set having a portion of the wires extending from the tube on each end;
    said first end of the wires secured on a first end of the ovoid chamber by a first inner sleeve and a first outside sleeve that impinge on the wires between the sleeves, said first end of the wires deformed to form the ovoid chamber;
    said second end of the wires secured on a second end of the ovoid chamber by a second inner sleeve and a second outside sleeve that impinge on the wires between the sleeves, said second end of the wires deformed to form the ovoid chamber;

a bail connected at a first end and a second end of the bail to the first end of the ovoid chamber and the second end of the ovoid chamber for rolling the ovoid chamber between the connected ends of the bail; and a handle connected to the bail for use of the rolling device by a user while standing erect.

* * * * *